US012801916B2

(12) United States Patent
Grollier et al.

(10) Patent No.: US 12,801,916 B2
(45) Date of Patent: Nov. 17, 2026

(54) NEUROMORPHIC CIRCUIT AND ASSOCIATED TRAINING METHOD

(71) Applicants: THALES, Courbevoie (FR); Centre national de la recherche scientifique, Paris (FR); UNIVERSITE PARIS-SACLAY, Gif sur Yvette (FR)

(72) Inventors: Julie Grollier, Gentilly (FR); Erwann Martin, Palaiseau Cedex (FR); Damien Querlioz, Arcueil (FR); Teodora Petrisor, Palaiseau Cedex (FR)

(73) Assignees: THALES, Courbevoie (FR); CENTRE NATIONAL DE LA RECHERCHE SCIENTIFIQUE, Paris (FR); UNIVERSITE PARIS-SACLAY, Gif sur Yvette (FR)

( * ) Notice: Subject to any disclaimer, the term of this patent is extended or adjusted under 35 U.S.C. 154(b) by 615 days.

(21) Appl. No.: 18/264,427

(22) PCT Filed: Feb. 8, 2022

(86) PCT No.: PCT/EP2022/053026
§ 371 (c)(1),
(2) Date: Aug. 7, 2023

(87) PCT Pub. No.: WO2022/171632
PCT Pub. Date: Aug. 18, 2022

(65) Prior Publication Data
US 2024/0303484 A1 Sep. 12, 2024

(30) Foreign Application Priority Data
Feb. 11, 2021 (FR) ....................................... 2101311

(51) Int. Cl.
*G06N 3/08* (2023.01)
*G06N 3/063* (2023.01)

(52) U.S. Cl.
CPC ............... *G06N 3/08* (2013.01); *G06N 3/063* (2013.01)

(58) Field of Classification Search
CPC .......... G06N 3/08; G06N 3/063; G06N 3/044; G06N 3/0499; G06N 3/065; G06N 3/09; G06N 3/048; G06N 3/088; G06N 3/049
See application file for complete search history.

(56) References Cited

U.S. PATENT DOCUMENTS 8,977,578 B1 * 3/2015 Cruz-Albrecht ......... G06N 3/04 706/12
2013/0325768 A1 * 12/2013 Sinyavskiy ............ G06N 3/049 706/16

(Continued)

OTHER PUBLICATIONS

Erwaan, Martin, et al., "EqSpike: Spike-driven equilibrium propagation for neuromorphic implementations", Jan. 15, 2021 (Jan. 15, 2021), pp. 1-17.

(Continued)

*Primary Examiner* — Tan H Tran
(74) *Attorney, Agent, or Firm* — Soquel Group LLC

(57) ABSTRACT

A neuromorphic circuit implementing a spiking neural network and including bidirectional synapses made by a set of memristors arranged in an array, neurons firing spikes at a variable rate and connected to neurons via a synapse, and a neural network training module including, for at least one bidirectional synapse, an estimation unit obtaining an estimation of the time derivative of the spike rate of each neuron, an interconnection having at least two positions between the synapse and each neuron, and a controller sending a control signal to the interconnection after a spike, the signal changing the position of the interconnection, so as to connect the estimation unit and the synapse.

10 Claims, 5 Drawing Sheets

(56) References Cited

U.S. PATENT DOCUMENTS

| | | | | |
|---|---|---|---|---|
| 2015/0269483 | A1* | 9/2015 | Nishitani | G06N 3/065 706/25 |
| 2015/0278684 | A1* | 10/2015 | Patwardhan | G06N 3/049 706/25 |
| 2018/0174053 | A1* | 6/2018 | Lin | G06N 3/049 |
| 2020/0356344 | A1* | 11/2020 | Cruz-Albrecht | G06N 3/065 |
| 2021/0319293 | A1* | 10/2021 | Lee | G06N 3/063 |
| 2022/0149200 | A1* | 5/2022 | Park | G06N 3/049 |

OTHER PUBLICATIONS

Fouda, M. E., et al: Spiking Neural Networks for Inference and Learning: A Memristor-based Design Perspective, Oct. 9, 2019 (Oct. 9, 2019), pp. 1-26.
Crisp, Kevin, “Models for Spiking Neurons: Integrate-and-Fire Units and Relaxation Oscillators”, The Journal of Undergraduate Neuroscience Education, [Online] vol. 17, No. E7-EI2, Jun. 30, 2019 (Jun. 30, 2019), pp. 1-6.
Querlioz , Damien , et al., “Immunity to Device Variations in a Spiking Neural Network With Memristive Nanodevices”, IEEE Transactions on Nanotechnology, IEEE Service Center, Piscataway, NJ, US, vol. 12, No. 3, May 1, 2013 (May 1, 2013), pp. 288-295.
FR 2101311, INPI Rapport de Recherche Preliminaire, Oct. 27, 2021, 2 pages.
International Search Report, PCT /EP2022/053026, Jun. 15, 2022, 2 pages.

* cited by examiner

NEUROMORPHIC CIRCUIT AND ASSOCIATED TRAINING METHOD

CROSS-REFERENCE TO RELATED APPLICATIONS

This application claims benefit under 35 USC § 371 of PCT Application No. PCT/EP2021/053026 entitled NEUROMORPHIC CIRCUIT AND ASSOCIATED TRAINING METHOD, filed on Feb. 8, 2022 by inventors Julie Grollier, Erwann Martin, Damien Querlioz and Teodora Petrisor. PCT Application No. PCT/EP2022/053026 claims priority of French Patent Application No. 21 01311, filed on Feb. 11, 2021.

FIELD OF THE INVENTION

The present invention relates to a neuromorphic circuit suitable for implementing a neural network and further relates to a method of training the neural network of the neuromorphic circuit.

BACKGROUND OF THE INVENTION

The development of the internet and of connected sensors leads to obtaining considerable amounts of data. Such phenomenon, often referred to as "big data", involves the use of computers which can make use of all the data obtained. Such use can take place in many fields, including automatic data processing, computer-aided diagnosis, predictive analysis, autonomous vehicles, bioinformatics or monitoring.

To implement such a use, it is known how to use machine learning algorithms belonging to programs which can be executed on processors such as CPUs or GPUs. A CPU (Central Processing Unit) is a processor, whereas a GPU (Graphic Processing Unit) is a graphics processor.

Among learning implementation techniques, the use of formal neural networks, and in particular deep neural networks, is increasingly widespread, such structures being considered very promising due to the performance thereof for many tasks such as automatic data classification, pattern recognition, automatic language translation and understanding, robotic control, automatic navigation, recommendation systems, anomaly detection, fraud detection, DNA studies and the discovery of new molecules.

A neural network generally consists of a succession of layers of neurons, each layer takes the inputs thereof from the outputs of the preceding layer. More precisely, each layer comprises neurons taking the inputs thereof from the outputs of the neurons of the preceding layer. Each layer is connected by a plurality of synapses. A synaptic weight is associated with each synapse. It is a real number, which takes positive and negative values. For each layer, the input of a neuron is the weighted sum of the outputs of the neurons of the previous layer, the weighting being made by the synaptic weights.

For an implementation in a CPU or GPU, von Neumann bottleneck problems arise due to the fact that the implementation of a deep neural network (with more than three layers and up to several tens of layers) involves using both the memory or the memories and the processor, while the latter elements are spatially separated. A congestion of the communication bus results therefrom, between the memory or the memories and the processor both while the neural network once trained, is used for performing a task, and all the more so, while the neural network is trained, i.e. while the synaptic weights thereof are set to solve the task in question with maximum performance.

It is thus desirable to develop dedicated hardware architectures, intermixing memory and computation, so as to produce fast neural networks with low power consumption and apt to learn in real-time.

It is known how to produce neural networks on the basis of a CMOS technology. CMOS is the acronym of Complementary Metal-Oxide-Semiconductor. CMOS refers both to a manufacturing process and to a component produced by such manufacturing process.

A neural network based on optical technologies is also known.

More specifically, three architectural proposals are the subject of specific studies: CMOS neural networks and CMOS synapses, optical neural networks and optical synapses, and CMOS neural networks and memory synapses. Memristive synapses are synapses using memristors. In electronics, a memristor is a passive electronic component. The name is a portmanteau word formed from the two English words memory and resistor. A memristor is a non-volatile memory component, the value of the electrical resistance thereof changing with the application of a voltage for a certain length of time and remaining at said value in the absence of voltage.

However, according to each of such technologies, each neuron occupies several tens of micrometers edgewise. For CMOS and optical technologies, each synapse also occupies several tens of micrometers edgewise. As a result, over a limited surface corresponding, e.g. to an electronic chip, the number of neurons and synapses which can be integrated is limited, which results in a reduction in the performance of the neural network.

For spiking neural networks having the aforementioned problems, there is also the difficulty of implementing training since the backpropagation technique, which is the most effective at present, cannot be directly used.

To train spiking neural networks, it is known how to use a principle derived from Hebb's rule according to which two neurons have a stronger synaptic link when the neurons fire simultaneously. For example, a stress is applied to each synapse so that the associated weight is increased if the two neurons connected to the synapse have each fired within a time interval less than a predefined threshold or is decreased otherwise.

However, because such technique does not solve the optimization of an overall objective function, the precision thereof is not always satisfactory.

SUMMARY OF THE DESCRIPTION

There is thus a need for a neuromorphic circuit which can be used for training a spiking neural network to a satisfactory precision, while maintaining a high integrability of the elements of the neuromorphic circuit and local training.

To this end, the description describes a neuromorphic circuit suitable for implementing a spiking neural network, the neuromorphic circuit comprising synapses produced by a set of memristors arranged in the form of an array network, each synapse having a value. The neuromorphic circuit comprises neurons, each neuron being suitable for firing at a variable rate, each neuron being connected to one or a plurality of neurons via a synapse, the neurons being arranged in successive layers of neurons, the layers of neurons comprising an input layer, at least one hidden layer of neurons and an output layer, the synapses being bidirectional for the neurons of the at least one hidden layer of neurons and of the output layer. The neuromorphic circuit comprises a neural network training module for at least one bidirectional synapse connecting a first neuron to a second neuron, the training module comprising, for the first neuron and the second neuron, an estimation unit suitable for obtaining an estimation of the time derivative of the rate of spikes fired by the neuron. The training module further includes an interconnection between the synapse and each neuron, the interconnection having at least two positions, and a controller suitable for sending a control signal to the interconnection when the first neuron fired, the control signal modifying the position of the interconnection so that the estimation unit of the second neuron is connected to the synapse.

According to particular embodiments, the neuromorphic circuit has one or a plurality of the following features, taken individually or according to all technically possible combinations:

- the controller is also apt to synchronize the two neurons so that the two neurons issue control signals modifying the value of the synapse according to the estimation of the time derivative of the fired spike rate of the second neuron.
- each memristor has a non-zero conductance for a voltage above a positive threshold and for a voltage below a negative threshold, the first neuron also being apt to fire a control signal, the amplitude of which at each instant is equal to an amplitude equal to one among the positive threshold and the negative threshold, the firing including, preferentially, only one change in amplitude.
- the second neuron is apt to fire a control signal proportional to the estimation of the time derivative of the spike rate obtained by the estimation unit.
- the controller controls the two neurons so that the two control signals are fired simultaneously.
- the interconnection has a sub-circuit for each neuron to which the synapse is connected, each sub-circuit comprising two switches.
- the estimation unit includes a sub-unit for obtaining the fired spike rate of said neuron, the obtaining sub-unit coding the spike rate in an output signal, the sub-unit for obtaining the spike rate being preferentially a leakage integrator circuit, the estimation unit including a delay of the output signal of the obtaining sub-unit, for obtaining a delayed signal, and a subtractor of the output signal from the obtaining sub-unit and the delayed signal of the delay unit, for obtaining a difference signal.
- the neuromorphic circuit further includes a filter at the output of the subtractor, the filter preferentially being a low-pass filter.
- the neuron is produced by a pulse relaxation oscillator.

The description further describes a method for training a spiking neural network that a neuromorphic circuit is suitable for implementing, the neuromorphic circuit comprising synapses produced by a set of memristors arranged in the form of an array network, each synapse having a value, the neuromorphic circuit comprising neurons, each neuron being capable of firing at a variable rate, each neuron being connected to one or a plurality of neurons via a synapse. The neurons are arranged in successive neuron layers, the neuron layers comprising an input layer, at least one hidden neuron layer and an output layer, the synapses being bidirectional for the neurons of the at least one hidden neuron layer and of the output layer. The neuromorphic circuit further comprises a neural network training module for at least one bidirectional synapse connecting a first neuron to a second neuron, the training module including, for each neuron, an estimation unit for obtaining an estimation of the time derivative of the rate of spikes fired by the neuron, an interconnection between the synapse and each neuron, the interconnection having at least two positions, and a controller. The training method includes the steps of sending a control signal by the controller to the interconnection when the first neuron has fired a spike, and of modifying the position of the interconnection so that the estimation unit of the second neuron is connected to the synapse.

BRIEF DESCRIPTION OF THE DRAWINGS

The features and advantages of the invention will appear upon reading the following description, given only as an example, but not limited to, and making reference to the enclosed drawings, wherein.

Figure 1:
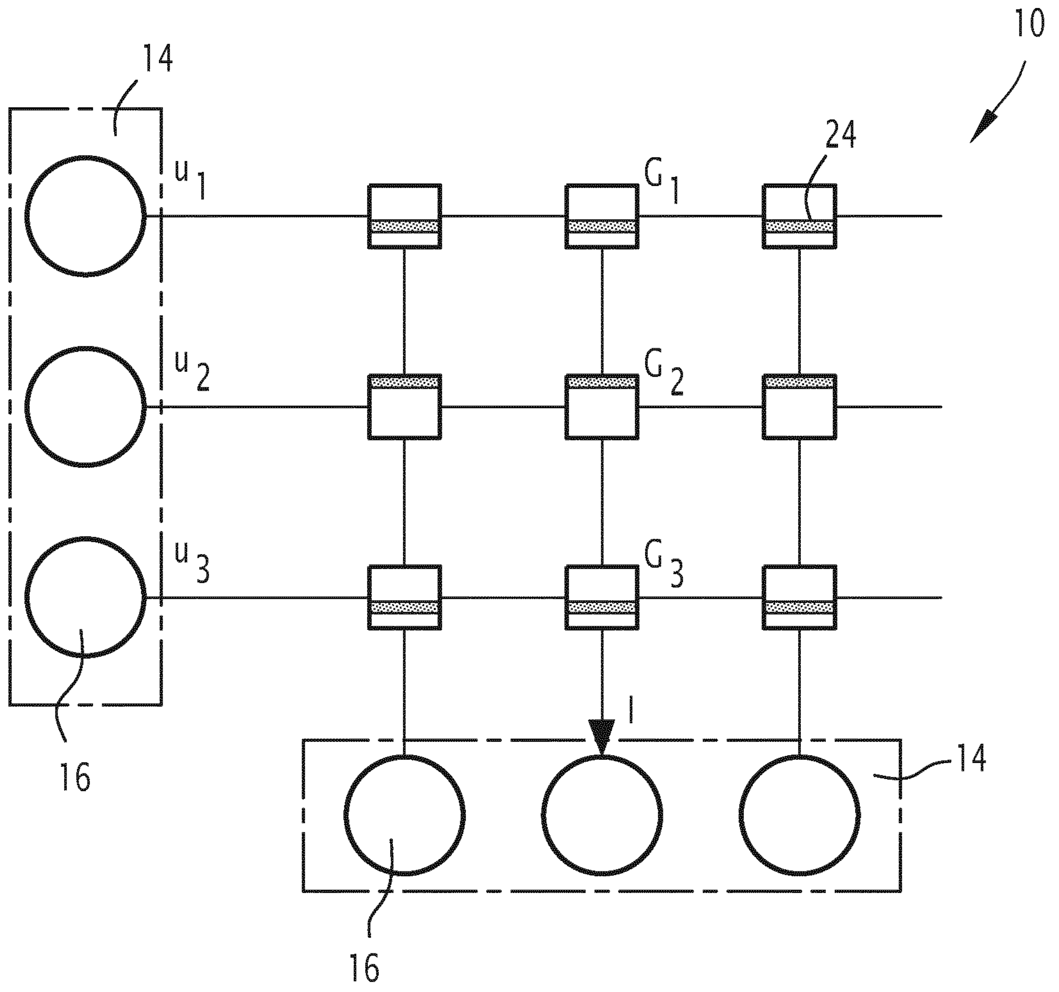
FIG. 1 is a schematic representation of an example of a neuromorphic circuit part including a plurality of neurons and synapses.

A part of a neuromorphic circuit 10 of a neural network is shown in FIG. 1.

DETAILED DESCRIPTION OF EMBODIMENTS

According to the example described, the neuromorphic circuit 10 is a single chip. The above means that all the components which will be subsequently described are located on the same chip.

Figure 2:
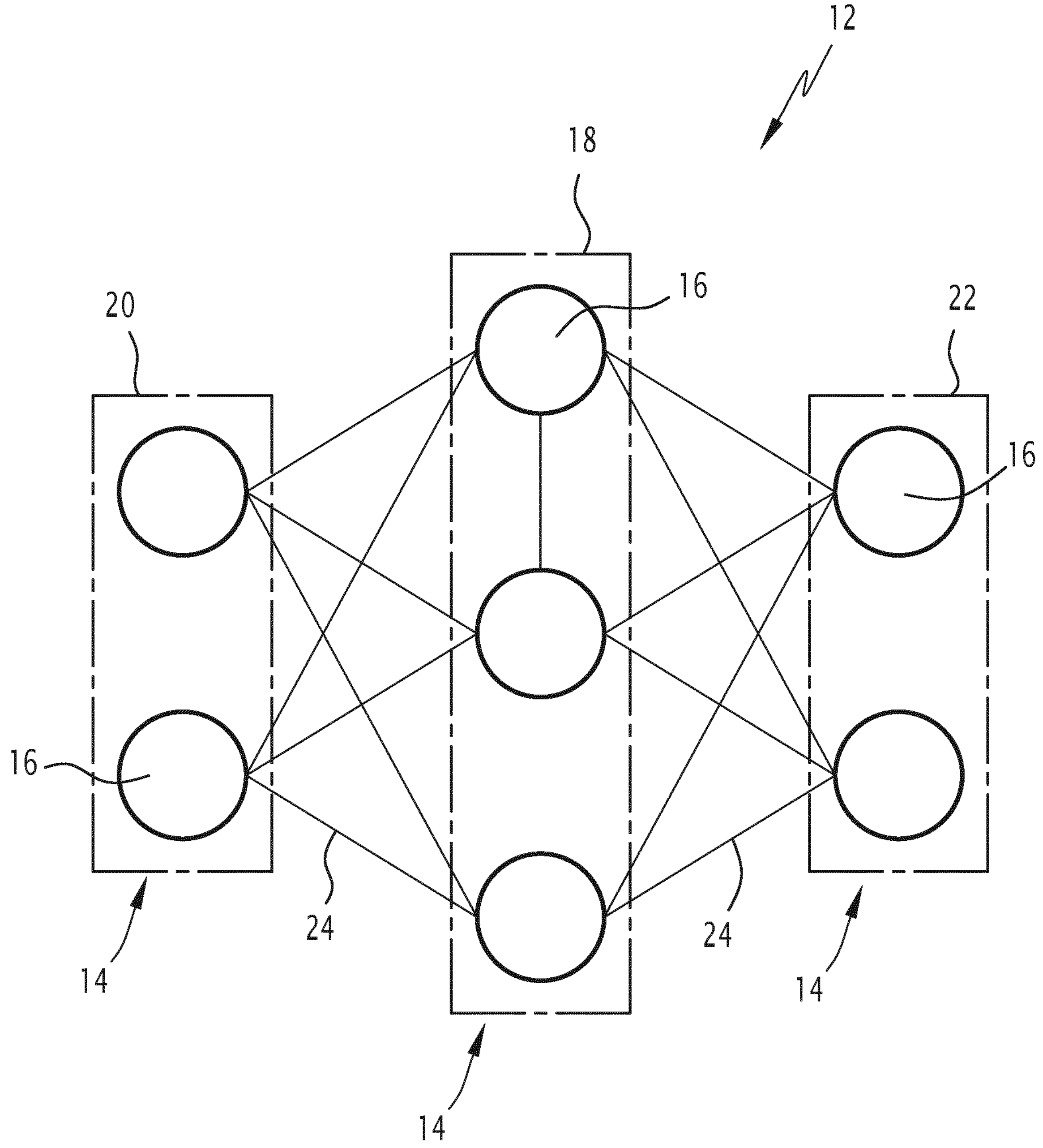
FIG. 2 is a schematic representation of an example of a neural network.
Figure 3:
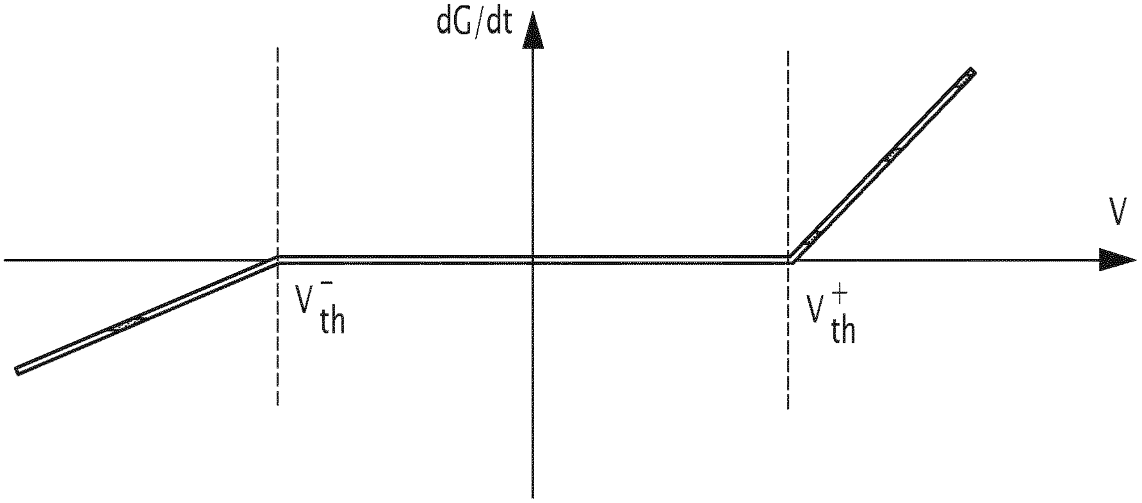
FIG. 3 is a graphic representation of the behavior of a memristor.

The neuromorphic circuit 10 is suitable for implementing a neural network 12 as shown schematically in FIG. 2.

The neural network 12 described is a network including an ordered succession of layers 14 of neurons 16, each of which takes the inputs thereof from the outputs of the preceding layer 14.

By definition, in biology, a neuron, or nerve cell, is an excitable cell forming the basic operational unit of the nervous system. Neurons transmit a bioelectric signal called action potential. Neurons have two physiological properties: excitability, i.e. the ability to respond to stimuli and convert same into nerve impulses (spikes), and conductivity, i.e. the ability to transmit spikes. In formal neural networks, the behavior of biological neurons is imitated by a mathematical function, called activation function, which has the property of being non-linear (to be able to transform the input in a useful way) and preferentially of being derivable (to make possible learning by back propagation of the gradient). Models closer to the biological neuron exist, herein the neuron fire spikes (or spike trains) with a certain frequency that depends on the incoming spikes. The activation function in such case can be represented as a function giving the variation, depending on the input current, of the average firing frequency. Within the framework of the present application, a neuron 16 is a component performing a function equivalent to such latter models.

More precisely, each layer 14 comprises neurons 16 taking the inputs thereof from the outputs of the neurons 16 of the preceding layer 14.

In the case of FIG. 2, the neural network 12 described is a network including a single hidden layer of neurons 18. However, such number of hidden layers of neurons is not limiting.

The uniqueness of the hidden layer of neurons 18 means that the neural network 10 includes an input layer 20 followed by the hidden layer of neurons 18 which is followed as such by an output layer 22.

The layers can be indexed by an integer index i, the first layer corresponding to the input layer 20 and the last layer corresponding to the output layer 22.

Each layer 14 is connected by a plurality of synapses 24.

In biology, a synapse refers to an operational contact zone which is established between two neurons 16. Depending on the behavior thereof, a biological synapse can either excite or inhibit the downstream neuron in response to the upstream neuron. In formal neural networks, a positive synaptic weight corresponds to an excitatory synapse while a negative synaptic weight corresponds to an inhibitory synapse. Biological neural networks learn through the modification of synaptic transmissions across the network. Similarly, formal neural networks can be trained to perform tasks by modifying synaptic weights according to a learning rule. Within the framework of the present application, a synapse 24 is a component performing a function equivalent to a synaptic weight with modifiable value.

A synaptic weight is thus associated with each synapse 24. For example, same is a real number, which takes positive, as well as negative values.

For each layer 14, the input of a neuron 16 is the weighted sum of the outputs of the neurons 16 of the previous layer 14, the weighting being made by the synaptic weights.

According to the example described, each layer 14 of neurons 16 is fully connected.

A fully connected layer of neurons is a layer wherein the neurons of the layer are each connected to all the neurons of the previous layer. Such a type of layer is more often referred to as "fully connected".

In the present case, the neural network 10 is a spiking neural network.

A spiking neural network is often referred to by the acronym SNN.

In such a spiking neural network, a neuron is a dynamic element varying in time as described hereinabove and characterized herein by the spike firing frequency thereof. When a so-called pre-synaptic neuron 16 upstream fires a spike, the synapse 24 weights the spike and transmits same to the so-called post-synaptic neuron 16, downstream, which fires a spike, if appropriate.

The stimulation transmitted by synapse 24 is a stimulation of a part of the neuron 16 downstream, called membrane and having a potential. If the membrane potential charges beyond a so-called activation threshold, the neuron 16 fires a spike.

More precisely, the synapse 24 multiplies the weight by the input activation. The input activation of the downstream neuron 16 is the output signal sent by the upstream neuron 16.

The neuron 16 downstream increases the membrane potential, compares same to a threshold, and fires an output spike when the membrane potential exceeds the threshold.

In some cases, a neuron 16 upstream is permanently activated (like an input neuron) in order to add biases to the membrane potential of the downstream neuron 16 which enriches the expressiveness of the function learned by the neural network 12. Hereinafter in the description, such a neuron 16 is called a "bias neuron".

The operation which has just been described is valid in the other direction.

More precisely, in the example shown in FIG. 2, for all the layers 14 of neurons 16, except for the first layer 20 and for the bias neurons 16, the neurons 16 are connected by a synapse 24 which is bidirectional.

As a result, the same calculation can be carried out by exchanging the role of the two neurons 16.

For making the discussion clearer, hereinafter in the description, the elements performing one of the aforementioned functions are referred to by the name of the function and not by a formulation like "circuit producing" or "circuit physically implementing".

As a specific example, a circuit producing a synapse 24 will simply be called a synapse 24 or a circuit physically implementing a neuron 16 will simply be called a neuron 16.

It could also be indicated that the part of neuromorphic circuit 10 shown in FIG. 1 corresponds to a set of two layers 14 of neurons 16 connected by synapses 24.

As an example, the vertically aligned neurons 16 form a first layer 14 and the horizontally aligned neurons 16 form a second layer 14.

The neuromorphic circuit 10 includes neurons 16, synapses 24 and a training module 26.

Each neuron 16 is produced with an integrator with leakage and spike firing.

Such a neuron is often called a LIF. The acronym "LIF" refers to the corresponding English name of "Leaky Integrate-and-Fire".

In practice, as explained hereinabove, each neuron 16 integrates the current received as input.

Each neuron 16 fires a spike when the membrane potential reaches a threshold.

Then, after a spike is fired, the neuron 16 resets the membrane potential and, during a period, does not integrate the current received as input.

The non-integration period is called the refractory period.

After the refractory period, the neuron 16 again integrates the current received at the input and the same mechanism starts again.

In the absence of a received spike, the membrane potential of the neuron 16 decreases towards the rest value thereof with a certain time constant. The time constant is denoted by $\gamma_{LIF}$.

Thereby, the neuron 16 fires spikes at a rate which varies with time.

The spike firing rate is $\rho$.

The set of spikes is usually called a "spike train".

In the example described each neuron 16 is a spike relaxation oscillator.

According to a first implementation, each neuron 16 is a CMOS circuit comprising as main elements: a membrane apt to be charged by integrating the currents generated by the neurons 16 of the preceding layers 14, a comparator, a spike generator and an element producing the leak.

The membrane of the neuron 16 has a capacitor as the main element thereof. The leakage resistance can be produced with an NMOS transistor (the abbreviation referring to the English name "Metal-Oxide-Semiconductor", the N indicating that same is an N-type MOS transistor) in saturation mode. A second NMOS transistor connected in parallel with the membrane capacitor makes it possible to make a switch at the terminals of the capacitor and to discharge same. The comparator is used for detecting whether the voltage at the terminals of the capacitor exceeds the activation threshold of the neuron 16.

The neuron 16 can also comprise additional modules, in particular for controlling the adaptability of the thresholds, the spike emission model or the spike shape.

Such an implementation can be achieved with CMOS technologies. For example, a neuron 16 can have a size ranging from 28 nanometers (nm) to 180 nm. To obtain a small neuron 16, a FDSOI type technology could be used. The abbreviation FDSOI refers to the English name "Fully Depleted Silicon On Insulator".

In another implementation, a neuron 16 is a neuristor, i.e. a component based on volatile resistive switching materials.

For example, a neuron 16 consists of two active memristors. The memristors can be based on resistive materials such as $NbO_{2-x}$ or $VO_x$ (where x is comprised between 0 and 2), with negative differential resistance. The neurons 16 have an oscillation frequency which depends on the input current. For such neurons 16, a module which adapts the spike shape is added so that it is possible to modify the synapses, as will be subsequently explained.

Each synapse 24 is produced by a set of memristors 30.

A memristor 30 is a component, the electrical resistance value of which changes permanently when a current is applied. Thereby, a datum can be recorded and rewritten by a control current. Such behavior is observed in particular in phase-change materials, ferroelectric tunnel junctions or oxide-based redox memories such as $HFO_x$ or $TiO_{2-x}$.

The change in conductance of a memristor 30 depends on the amplitude and on the duration of the voltage pulses applied through the memristor 30.

Such a memristor 30 has a behavior which can be modeled as follows:

$$\Delta G = \begin{cases} s^+(V - V_{th}^+)e^{\eta^+ \frac{G-G_{min}}{G_{max}-G_{min}}}\Delta t_{spike} & \text{if } V > V_{th}^+ > 0 \\ s^-(V - V_{th}^-)e^{\eta^- \frac{G_{max}-G}{G_{max}-G_{min}}}\Delta t_{spike} & \text{if } V < V_{th}^- < 0 \\ 0 & \text{otherwise} \end{cases}$$

Where:

$s^+$ is the slope of the conductance of the memristor 30 as a function of the voltage for an applied voltage greater than a positive threshold voltage $$V_{th}^+,$$

$s^-$ is the slope of the conductance of the memristor 30 as a function of the voltage for an applied voltage lower than a negative threshold voltage $$V_{th}^-,$$

$G_{min}$ is the minimum conductance attainable by the memristor 30, $G_{max}$ is the maximum conductance attainable by the memristor 30, $\eta^+$ is a coefficient of non-linearity corresponding to the fact that the amplitude of change of the conductance can depend on the conductance state of the memristor 30, $\eta^-$ is a coefficient of non-linearity corresponding to the fact that the amplitude of change in conductance can depend on the conductance state of the memristor 30, and $\Delta t_{spike}$ is the duration of the voltage pulse applied to the memristor 30.

The previous model shows that by combining two memristors 30 in parallel, it is possible to produce positive and negative weights.

Indeed, by obtaining the weight as the difference of the two conductances, the set of the two memristors 30 can be used for producing a weight of any sign.

For example, one of the memristors 30 is kept fixed at an intermediate value and the conductance of the other memristor 30 varies depending on the voltage pulse applied to the memristor.

It should be noted that the memristors 30 are arranged in the form of an array network.

Thereby, as can be seen in FIG. 1, for activations $u_1$, $u_2$ and $u_3$ for the three neurons 16 of the first layer 14, the second neuron 16 of the second layer 14 will have an incident current/corresponding to:

$$I = \sum_i G_i . u_i$$

Where the index i gives the number of the synapse 24 concerned and the activation of the neuron 16 concerned.

The training module 26 is a module suitable for training the neural network 12.

The training of a neural network 12 consists of determining the suitable weights so that the neural network 12 performs the desired task.

The training module 26 is suitable for operating at an adjustable learning rate.

For this purpose, the neuromorphic circuit 10 includes a dedicated adjustment component, such as a resistor. The resistor can be positioned at the output of the filter 42*fd* which will be subsequently described.

Figure 4:
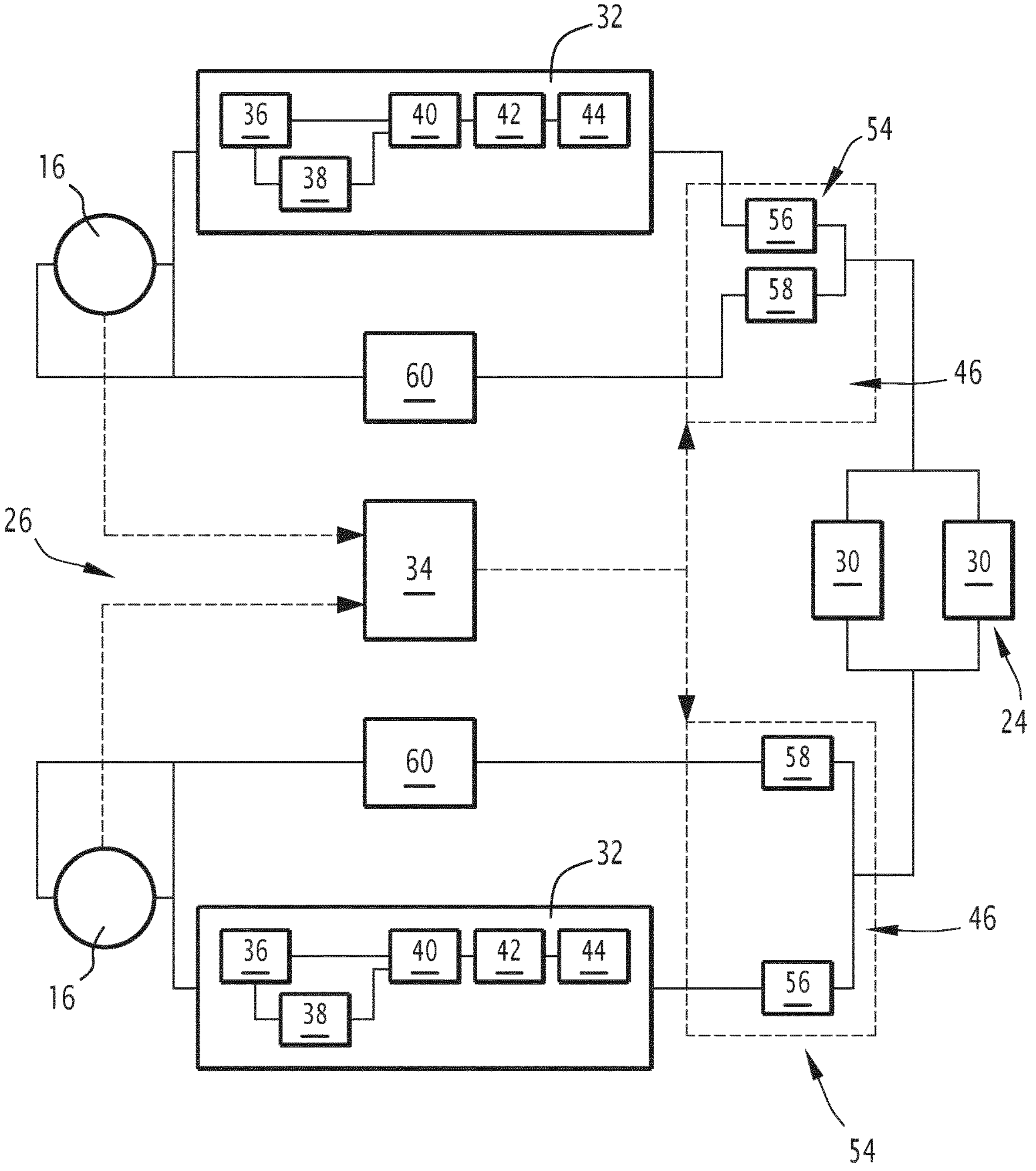
FIG. 4 is a schematic representation of an example of a synapse and of two neurons.

With reference to FIG. 4 which shows a synapse 24 connected to a first neuron 16 and a second neuron 16, the training module 26 includes an estimation unit 32 for each neuron 16 and a controller 34.

The estimation unit 32 is suitable for obtaining an estimation of the time derivative of the fired spike rate of the neuron 16.

Such expression means that the estimation unit 32 is suitable for obtaining an estimation of the derivative of the spike rate at a given instant.

The estimation unit 32 takes as input, the spike train fired by the neuron 16 and delivers as output, a signal encoding the derivative of the spike firing rate.

In the present case, the signal is a spike signal proportional to the estimated firing rate.

The estimation unit 32 includes an obtaining sub-unit 36, a delayer 38 and a subtractor 40.

The obtaining sub-unit 36 is a sub-unit for obtaining the fired spike rate of the neuron 16.

The obtaining sub-unit 36 takes as input, the spike train fired by the neuron 16 to which the obtaining sub-unit 36 is connected and outputs an output signal encoding the fired spike rate.

In the present case, the sub-unit 36 for obtaining the spike rate is a leakage integrator circuit.

Such a circuit is more often referred to by the term "Leaky-Integrator".

The leakage coefficient of the leaky integrator is denoted by $\gamma_{LI}$.

The obtaining sub-unit 36 [is] then suitable for generating a voltage $V_{LI}$ varying proportionally to the firing rate ρ of the spike train.

Thereby, we have:

$$V_{LI}(t) \propto \frac{\rho}{\gamma_{LI}}$$

The delayer 38 is suitable for delaying the signal issued by the obtaining sub-unit 36.

More precisely, the delay element 38 is suitable for bringing a duration delay t into the signal of the obtaining sub-unit 36.

Thereby, the delayer 38 issues a delayed signal at the output thereof.

Such a signal can be written mathematically as $V_{LI}(t-\tau)$.

The subtractor 40 is a subtractor of the output signal of the obtaining sub-unit 36 and of the delayed signal of the delayer 38.

The inputs of the subtractor 40 are thereby connected to the outputs of the obtaining sub-unit 36 and of the delayer 38.

The signal at the output of the subtractor 40 is called a difference signal.

The difference signal $V_D$ satisfies the following relations:

$$V_D = V_{LI}(t) - V_{LI}(t-\tau) \cong \tau\frac{\partial V_{LI}(t)}{\partial t} \propto \frac{\tau}{\gamma_{LI}}\dot{\rho}$$

The difference signal $V_D$ is a signal encoding the derivative of the spike firing rates.

In fact, the difference signal $V_D$ is a signal having an amplitude proportional to the derivative of the spike firing rate.

According to the example described, the computer 32 further comprises filter 42 and a multiplication sub-unit 44.

The filter 42 is positioned at the output of the subtractor 40.

The filter 42 is thus a filter of the difference signal serving to attenuate the variations thereof.

In the example described, the filter 42 is a low-pass filter.

The multiplication sub-unit 44 is suitable for multiplying an incident signal by a coefficient which is herein the given learning rate of the training module 26.

The multiplication sub-unit 44 is placed at the output of the filter 42.

Such a multiplication is used for controlling the modification of the weights so that the multiplication is done gradually. The convergence of training is thereby enhanced.

Each of the sub-units of the estimation unit 32 is produced in the form of a CMOS component.

The output of the estimation unit 32 is thus a signal proportional to the time derivative of the fired spike rate $\dot{\rho}$. The coefficient of proportionality is hereinafter denoted by ε.

The controller 34 is suitable for sending a control signal to all the synapses 24 to which the neuron 16 is connected.

The controller 34 is suitable for sending the activation signal when the first neuron 16 fired a spike.

The controller 34 sends the activation signal to an interconnection 46 which is also a part of the training module 26.

The interconnection 46 has a plurality of positions, and in particular a position wherein the estimation unit 32 of the second neuron 16 is connected to the synapse 24 and another position wherein the estimation unit 32 of the second neuron 16 is not connected to the synapse 24.

The control signal leads to the modification of the position of the interconnection 46 so that the estimation unit 32 of the second neuron 16 is connected to the synapse 24.

According to the example described, the interconnection 46 includes a sub-circuit 54 for each neuron 16 to which the synapse 24 is connected.

The synapse 24 is connected at one end to the sub-circuit 54 of the first neuron 16 and at the other end to the sub-circuit 54 of the second neuron 16.

Each sub-circuit 54 comprises two switches 56 and 58.

Each position of the switches 56 and 58 corresponds to a state of the switches 56 and 58.

In the example described, each switch 56 and 58 is a transistor.

There are also four possible positions: ON state for the two transistors 56 and 58 (first position), OFF state for the two transistors 56 (second position) and 58 and ON state for one of the transistors 56 and 58 and OFF state for the other of the two transistors 56 and 58 (third and fourth positions).

However, in the case of FIG. 4, the states of the transistors 56 and 58 are opposite, so that only two positions are possible, namely the ON state for one of the transistors 56 and 58 and the OFF state for the other of the two transistors 56 and 58.

Each of the transistors 56 and 58 includes a drain D, a gate G and a source S.

The training module 26 further includes, for each neuron 16, a conveyor of current 60 providing the circulation of the current between a neuron 16 and other neurons 16.

The conveyor of current 60 is a tripole which guarantees that the signals fired by the neurons 16 propagate bidirectionally.

Indeed, the conveyor of current 60 can be used both to send a pulse to the neurons 16 of the next layer 14 and to impose a value on the synapse 24 connected upstream. In the absence of a fired spike, the conveyor of current 60 copies the post-synaptic rest potential to one of the terminals of the synapse 24, the other terminal of the synapse 24 having the pre-synaptic rest potential.

When a pre-synaptic spike is fired, the generated current proportional to the resistance of a synapse 24 arrives at one of the two input terminals of the conveyor of current 60 and is copied to the output terminal of the synapse 24 in order to charge the membrane capacitance of the post-synaptic neuron 16. When the activation threshold is exceeded, the generated post-synaptic potential is sent to the next layer 14 as well as to the second input of the conveyor of current 60 in order to be able to write on the synapse 24.

According to the example described the drain D of the first transistor 56 is connected to the output of the estimation unit 32, the gate G of the first transistor 56 is connected to the controller 34 and the source S of the first transistor 56 is connected to the synapse 24.

The drain D of the second transistor 58 is connected to the output of the conveyor of current 60, the gate G of the second transistor 58 is connected to the controller 34 and the source S of the second transistor 58 is connected to the synapse 24.

The controller 34 is also apt to synchronize the two neurons 16 so that the two neurons 16 issue control signals modifying the value of the synapse 24 as a function of the estimation of the time derivative of the fired spike rate of the second neuron 16.

The control signals issued by each neuron 16 differ as will be subsequently explained later in the present description.

By means of the controller 34, the control signals are synchronized so that the voltage applied to the synapse 24 lets same to be updated to the desired value.

The operation of the neuromorphic circuit 10, and more specifically of the training module 26, is now described with reference to a method of training the neural network 12.

During the learning phase, the first neuron 16 fires a spike.

The controller 34 sends an activation signal to all the synapses 24 to which the neuron 16 is connected.

The controller 34 then forces the first transistor 56 of the sub-circuit 54 of the second neuron 16 to be in the ON state.

The controller 34 is used for ensuring that the sub-circuits 54 of the neurons 16 are in the appropriate state for issuing a control signal at an instant to.

Figure 5:
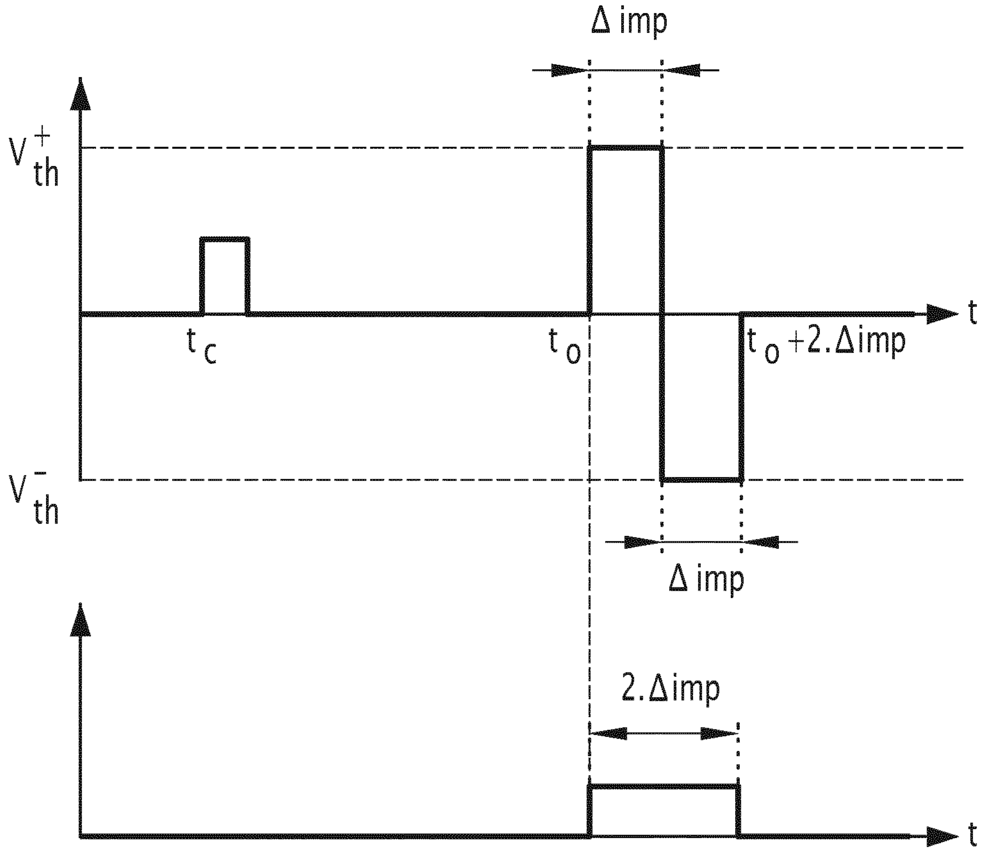
FIG. 5 is a schematic representation of an example of a chronogram of the operation of the updating of the synapse shown in FIG. 4.

The control signals issued are represented in the chronogram shown in FIG. 5.

The first neuron 16 then issues a first control signal the amplitude of which is at each instant equal to one among the positive threshold voltage $$V_{th}^{+}$$

of the memristor 30 to be updated and the negative threshold voltage $$V_{th}^{-}$$

of the memristor 30 to be updated.

According to the example described, the first control signal includes only one change in amplitude, so that the first control signal includes a spike of positive amplitude followed by a spike of negative amplitude.

The positive amplitude spike has as amplitude the positive threshold voltage $$V_{th}^{+}$$

of the memristor 30 to be updated whereas the negative amplitude spike has as amplitude the negative threshold voltage $$V_{th}^{-}$$

of the memristor 30 to be updated.

The positive amplitude spike and the negative amplitude spike have the same duration denoted by $\Delta t_{imp}$.

The estimation unit 32 of each second neuron 16 is triggered and issues a voltage pulse having a pulse proportional to the time derivative of the fired spike rate, the pulse having a duration $2*\Delta t_{imp}$. The voltage pulse corresponds to the second control signal.

By means of the controller 34, the second control signal is thus synchronized with the first control signal, the pulse issued by the estimation unit 32 temporally covering the first control signal (simultaneous issuing).

The modification signal is such that the voltage applied in the memristor 30 is thus firstly between the instant $t_0$ and the instant $t_0+\Delta t_{spike}$, a voltage of amplitude $$V_{th}^{+} + \varepsilon\dot{\rho}$$

and then between the instant $t_0+\Delta t_{spike}$ and the instant $t_0+2*\Delta t_{spike}$, a voltage of amplitude $$V_{th}^{-} + \varepsilon\dot{\rho}.$$

The above means that the firing of a spike by the first neuron 16 has led to the updating of all the values of the synapses 24 connected to the first neuron 16.

The updating is performed depending on the value of the time derivative of the fired spike rate of the second neuron 16.

More precisely, the updating is performed depending on the value of the aforementioned time derivative and on the value of the fired spike rate of the first neuron 16.

It can be shown that the above means that the rate of variation of the value of the synapse 24 is the product between the fired spike rate of the first neuron 16 and the time derivative of the fired spike rate of the second neuron 16.

By denoting by W the value of synapse 24, mathematically we can write:

$$\frac{dW}{dt} \propto \rho_{first\ neuron} * \dot{\rho}_{second\ neuron}$$

Because of the bidirectional character of the synapses 24, when the second neuron 16 will fire a spike, the updating of the same synapse 24 is also performed according to the value of the time derivative of the fired spike rate of the first neuron 16.

One then has:

$$\frac{dW}{dt} \propto \rho_{first\ neuron} * \dot{\rho}_{second\ neuron} + \dot{\rho}_{first\ neuron} * \rho_{second\ neuron}$$

Same corresponds to the implementation of a local learning rule at each synapse 24 which has the particularity of modifying the value thereof proportionally to the change in firing frequency of one of the neurons 16 for each spike fired by the other neuron 16.

The above corresponds to a modification of a learning law called equilibrium propagation which makes the continuous modification of weights possible, depending on the local dynamics of the neurons 16 and which encodes the derivative of the error in the changes of spike frequency during the training phase of the neural network 12. Such modification of the learning law is used for the implementation with memristors with an operational performance equivalent to the backpropagation of the error gradient, by adding only a training module 26 which consumes little resources. In fact, the training module 26 includes a set of inexpensive units in terms of hardware for each neuron 16 instead of external memories, expensive in terms of space and of execution time, as well as specific circuits for modifying each memristor according to the gradient of the explicit error.

Thereby, such learning is carried out with a training module 26 relatively easy to implement since it suffices to use a controller 34 (a central controller or a controller per pair of neurons 16, accordingly), an estimation unit 32 for each neuron 16 as well as an interconnection 46 for each synapse 24.

In in this way it is possible to obtain a neuromorphic circuit 10 with energy savings estimated to be at least 2 orders of magnitude less compared to GPU von Neumann architectures.

Furthermore, since the training module 26 can be produced with CMOS components, the training module 26 is highly efficient.

Thereby, the training module 26 allows a spiking neural network to learn with good precision while maintaining a high integrability of the elements of the neuromorphic circuit 10.

Such a neuromorphic circuit 10 is suitable in particular for performing image classification with local supervised learning.

The neuromorphic circuit 10 is then a chip used for carrying out an adaptive classification at high speed and at low power. In particular, such a neuromorphic circuit 10 can learn during use.

Due to the different degrees of maturity of memristive technologies and to the inherent variability of such components, the robustness against defects of the neuromorphic circuit 10 can be improved by considering monolithic elements such as a one transistor type-one memristor per synapse (acronym 1T1R). Such structure is used for a finer adjustment of the conductances of the memristors 30 and remains below the imprint on chip of the production of all-CMOS synapses.

The invention claimed is:

1. A neuromorphic circuit implementing a pulsed neural network, the neuromorphic circuit comprising:

synapses produced by a set of memristors arranged in the form of an array network, each synapse having a value, each memristor having a non-zero conductance for a voltage above a positive threshold and for a voltage below a negative threshold, the first neuron issuing as a control signal, a pulse the amplitude of which is at each instant equal to one among the positive threshold and the negative threshold;

neurons, each neuron firing spikes at a variable rate, each neuron being connected to one or to a plurality of neurons via one of said synapses, the neurons being arranged in layers of successive neurons, the layers of neurons comprising:

an input layer;

at least one hidden layer; and an output layer;

said synapses being bidirectional for the neurons of the at least one hidden layer and of the output layer; and a training module of the neural network, the training module comprising, for at least one bidirectional synapse connecting a first neuron to a second neuron:

for the first neuron and the second neuron, an estimation unit obtaining an estimation of the time derivative of the fired spike rate of the first neuron and of the second neuron;

an interconnection between the at least one bidirectional synapse and each neuron, the interconnection having at least two positions; and a controller sending a control signal to said interconnection when the first neuron has fired a spike, the control signal modifying the position of said interconnection so that said estimation unit of the second neuron is connected to the at least one bidirectional synapse.

2. The neuromorphic circuit according to claim 1, wherein said controller synchronizes the first and second neurons so that the first and second neurons issue control signals modifying the value of the at least one bidirectional synapse according to the estimation of the time derivative of the fired spike rate of the second neuron.

3. The neuromorphic circuit according to claim 1, wherein the pulse comprises only one change in amplitude.

4. The neuromorphic circuit according to claim 2, wherein the second neuron issues as a control signal, a pulse proportional to the estimation of the time derivative of the spike rate obtained by said estimation unit.

5. The neuromorphic circuit according to claim 2, wherein said controller controls both neurons so that both control signals are issued simultaneously.

6. The neuromorphic circuit according to claim 1, wherein said interconnection comprises a sub-circuit for each neuron to which the at least one bidirectional synapse is connected, each sub-circuit comprising two switches.

7. The neuromorphic circuit according to claim 1, wherein said estimation unit comprises:

a sub-unit for obtaining the fired spike rate of the neuron, the sub-unit encoding the spike rate in an output signal, the sub-unit for obtaining the spike rate comprising a leaky integrator circuit, a delayer for the output signal of the obtaining sub-unit (36), for obtaining a delayed signal, a subtractor of the output signal of the obtaining said sub-unit and of the delayed signal from said delayer, for obtaining a difference signal.

8. The neuromorphic circuit according to claim 7, further comprising a filter at the output of said subtractor, the filter comprising a low-pass filter.

9. The neuromorphic circuit according to claim 1, wherein said neurons are pulse relaxation oscillators.

10. A method for training a spiking neural network that a neuromorphic circuit implements, the neuromorphic circuit comprising:

synapses produced by a set of memristors arranged in the form of an array network, each synapse having a value, each memristor having a non-zero conductance for a voltage above a positive threshold and for a voltage below a negative threshold, the first neuron issuing as a control signal, a pulse the amplitude of which is at each instant equal to one among the positive threshold and the negative threshold;

neurons, each neuron firing spikes at a variable rate, each neuron being connected to one or a plurality of neurons via a synapse, the neurons being arranged in layers of successive neurons, the layers of neurons comprising:

an input layer;

at least one hidden layer; and an output layer;

the synapses being bidirectional for the neurons of the at least one hidden layer and of the output layer; and a training module of the neural network, the training module comprising, for at least one bidirectional synapse connecting a first neuron to a second neuron:

for the first neuron and the second neuron, an estimation unit suitable for obtaining an estimation of the time derivative of the fired spike rate of the first neuron and of the second neuron;

an interconnection between the at least one bidirectional synapse and each neuron, the interconnection comprising at least two positions; and a controller, the training method comprising:

sending, by the controller, a control signal to the interconnection when the first neuron has fired a spike; and modifying the position of the interconnection so that the estimation unit of the second neuron is connected to the at least one bidirectional synapse.

* * * * *